United States Patent [19]

Colling, Jr.

[11] Patent Number: 4,584,960
[45] Date of Patent: Apr. 29, 1986

[54] HIGH RESOLUTION VEHICLE CONTROL SYSTEM

[75] Inventor: Arthur K. Colling, Jr., Monson, Mass.

[73] Assignee: United Technologies Corporation, Hartford, Conn.

[21] Appl. No.: 566,002

[22] Filed: Dec. 27, 1983

[51] Int. Cl.⁴ .............................................. B63G 8/22
[52] U.S. Cl. ..................................... 114/333; 98/1.5; 244/118.5
[58] Field of Search ....................... 114/333, 331, 330; 244/118.5; 98/1.5

[56] References Cited

U.S. PATENT DOCUMENTS

| | | | |
|---|---|---|---|
| 2,972,972 | 2/1961 | Allen | 114/333 |
| 2,983,211 | 5/1961 | Andresen | 98/1.5 |
| 3,169,466 | 2/1965 | Cramer | 98/1.5 |
| 3,711,044 | 1/1973 | Matulich | 244/118.5 |
| 4,029,034 | 6/1977 | Mason | 114/333 |
| 4,164,896 | 8/1979 | Aldrich | 98/1.5 |
| 4,261,416 | 4/1981 | Hamamoto | 244/118.5 X |
| 4,462,561 | 7/1984 | Cronin | 244/118.5 |

Primary Examiner—David H. Brown
Attorney, Agent, or Firm—John Swiatocha

[57] ABSTRACT

Atmospheric conditions experienced by a vehicle are controlled in response to the sensing of an absolute value of a parameter indicative of desired conditions and thereafter, when conditions within an acceptable range are achieved, in response to a differential sensing of variations of the parameter from that achieved on the basis of the absolute sensing.

8 Claims, 3 Drawing Figures

HIGH RESOLUTION VEHICLE CONTROL SYSTEM

DESCRIPTION

1. Technical Field

This invention relates to a system for controlling the operational atmosphere experienced by a vehicle.

2. Background Art

In controlling the atmospheric conditions experienced by a vehicle, it is normal practice to control a particular parameter indicative of the desired conditions. For example, control of the operational depth of an undersea vehicle may be effected by maintenance of a desired water depth pressure at the exterior of the vehicle hull. Likewise, comfort control in the cabin of an aircraft may be effected by controlling cabin pressure and temperature. Typically, such control involves a sensing of the parameter, comparison of the parameter with a known desired value corresponding to the conditions sought to be achieved and adjustment in some aspect of vehicle operation to minimize the error between the actual and desired values of the relevant parameter.

In general, prior art vehicle control systems sense the parameter with an absolute sensor, i.e., one which senses with respect to a fixed reference value of the parameter. In pressure sensing for depth controls, absolute pressure sensors most often use sea level (zero water pressure) as the reference value. Thus, it will be seen that depth control at extreme depths (several thousand feet) with such an absolute sensor, requires high sensor accuracy over a broad operating range for determining when a desired reference depth is reached by the vehicle as well as high resolution for sensitivity to undesired straying of the vehicle from the reference depth. While high accuracy sensors and high resolution sensors are known, sensors exhibiting both high accuracy over a wide range, as well as high resolution and sensitivity to parametric changes, if available at all, are generally characterized by such cost and complexity as to render prohibitive the use thereof for applications of the control system of this invention.

In some instances, operation at a constant control value of the parameter within a relatively broad range (as determined by sensor accuracy) about a desired reference value of the parameter (± a given percentage) may be just as acceptable as operation at the particular reference value itself. For example, in an aircraft, passenger comfort does not seem to suffer from operation at cabin pressures corresponding to altitudes hundreds of feet different from the actual altitude, so long as cabin pressure is held constant. Likewise, in the operation of undersea vehicles, precise maintenance of a control depth within a range of a desired, reference depth may be just as acceptable as operation precisely at the reference depth itself. As will be apparent from the following discussion, such control by maintenance of a constant control value of a parameter within an acceptable range of a desired reference value of the parameter is achieved by the present invention without necessitating the prohibitively complex and costly high accuracy and high resolution absolute sensors described hereinabove.

DISCLOSURE OF INVENTION

It is therefore among the objects of the present invention to provide a system for controlling the operating characteristics of a vehicle without the need for complex and expensive, high accuracy, high resolution sensing and measuring equipment.

In accordance with the present invention, atmospheric conditions experienced by a vehicle are controlled in response to the sensing of an absolute value of a parameter and, when conditions are brought to a control value within an acceptable range of a desired, reference value of the parameter, atmospheric conditions are controlled in response to a differential sensing of variations from the control value. In this manner, atmospheric conditions of the system are controlled with high resolution yet without the cost and complexity associated with high-accuracy, high resolution absolute sensors.

The control system of the present invention finds utility in undersea vehicles for controlling depth (atmospheric conditions at the exterior of the vehicle hull) as well as in aircraft for controlling cabin pressurization (atmospheric conditions within the aircraft interior). The system comprises an absolute pressure sensor, a differential pressure sensor and a controller responsive to the outputs of the two sensors. The controller controls vehicle pressurization in response to the absolute sensor to achieve operation at a control pressure within a range (as determined by absolute sensor accuracy) of a desired reference pressure, and in response to the differential pressure sensor, to minimize excursions of the vehicle from the control pressure.

BEST MODE FOR CARRYING OUT THE INVENTION AND INDUSTRIAL APPLICABILITY THEREOF

Figure 1:
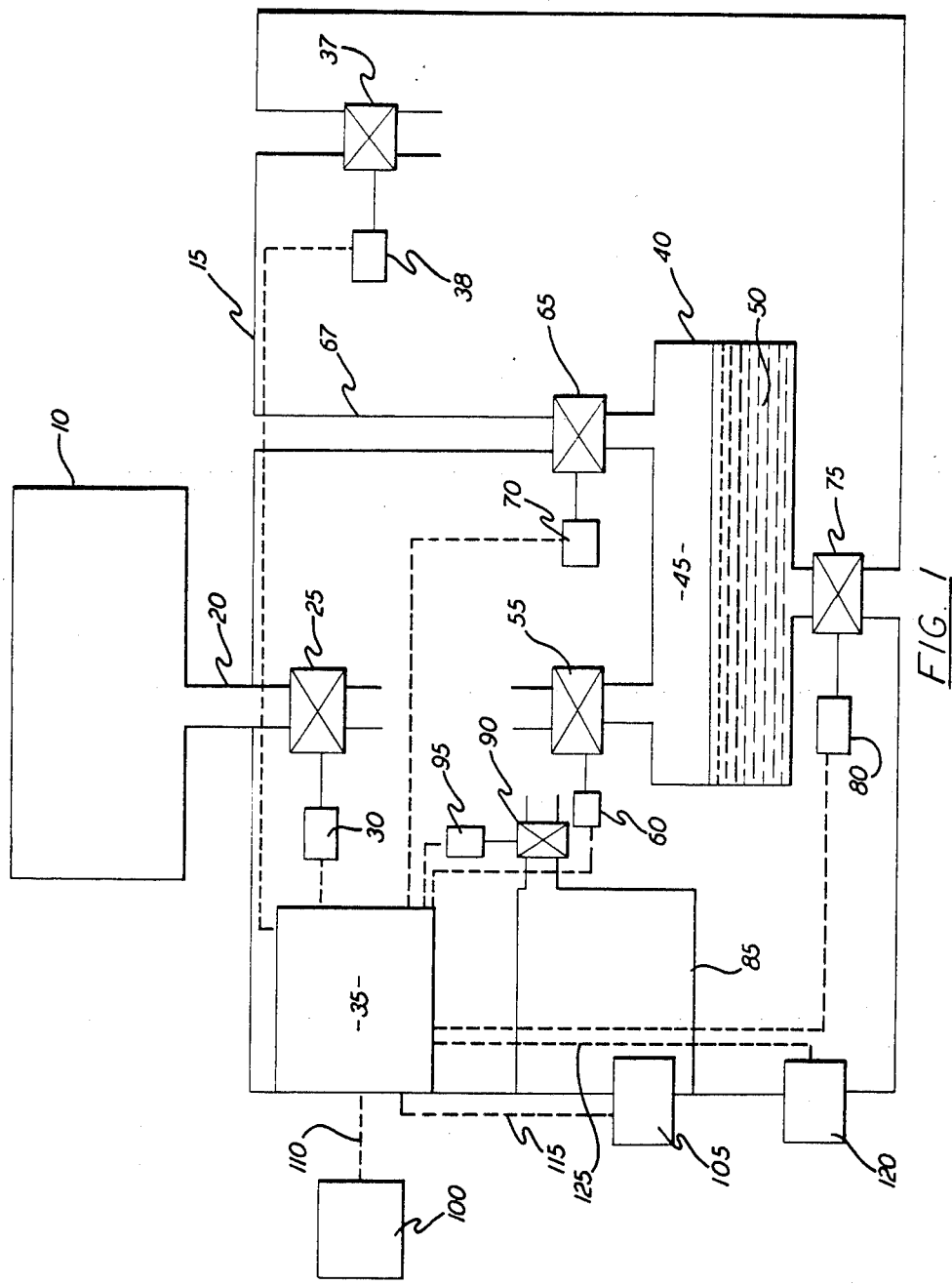
FIG. 1 is a schematic representation of a submergible vehicle with which the control system of the present invention may be employed.

FIG. 1 diagrammatically illustrates a submergible vehicle (buoy) employing the control system of the present invention, the vehicle comprising a source of pressurized gas 10 feeding an enclosure or chamber (hull) 15 through conduit 20 having pressure regulator 25 disposed therein, regulator 25 being operated by actuator 30. Any suitable gas such as air or nitrogen may be employed. Source 10 may comprise a vessel filled with a stored high pressure gas, or a means for generating gas from a solid or liquid propellant such as gunpowder or hydrazine, respectively. Actuator 30 is operated by controller 35. Pressure regulator 25 lowers the pressure of the gas admitted into enclosure 15 from tank 10 to establish consistency of gas flow downstream of the pressure regulator at given valve settings, and to provide a positive pressure to the interior of enclosure 15 slightly higher than local water pressure to reduce the loads on the enclosure and minimize the required strength of the enclosure walls. Gas is vented from enclosure 15, when required, through valve 37 operated by actuator 38 which is controlled by controller 35.

The vehicle further comprises a rigid walled buoyancy chamber 40 which accommodates a volume of gas 45 and a volume of water 50 therewithin, the proportions of gas volume and water volume determining the buoyancy of the vehicle. Gas is admitted into buoyancy chamber 40 from the interior of enclosure 15 through valve 55, operated by actuator 60 which is controlled by controller 35. Air is vented from buoyancy chamber 40 through valve 65 in conduit 67, this valve veing operated by actuator 70 which is also controlled by controller 35. Water is both admitted into and discharged from buoyancy chamber 40 through valve 75 operated by actuator 80 controlled by controller 35.

Enclosure 15 also houses a reference volume (reference pressure chamber) 85, gas being admitted into the reference volume and discharged therefrom through valve 90 operated by actuator 95, also controlled by controller 35. Controller 35 receives input signals thereto from an absolute pressure sensor 100 which senses the pressure (relative to sea level) of water at the depth of the buoy and from a differential pressure sensor 105 which senses the difference in pressure between the interior of reference volume 85 and the water at the depth of the buoy. Controller 35 also receives an input signal thereto from a differential pressure sensor 120 which senses the difference in pressure between the interior of enclosure 15 and the water at the depth of the buoy. Signals are provided to controller 35 from sensors 100, 105 and 120 through lines 110, 115 and 125, respectively. The controller is programmed with one or more values of desired operational depths.

Operation of the vehicle is as follows. Assuming for purposes of illustration that the vehicle is submerged at a given depth and operation of the vehicle at a greater depth programmed within controller 35 is desired, the controller compares the value of desired depth with the actual depth sensed by pressure sensor 100 and energizes actuators 70 and 80 to open valves 65 and 75, respectively. Opening valve 65 releases gas 45 from buoyancy chamber 40, the volume of released gas being replaced in the buoyancy chamber by water admitted thereinto through valve 75. The water level in chamber 40 having increased, the buoyancy of the vehicle is reduced and the vehicle descends. As the vehicle descends, the water pressure on enclosure 15 increases and therefore, controller 35 energizes actuator 30 on the basis of the input signal from pressure sensor 120 to adjust pressure regulator 25, admitting more gas into the enclosure to raise the pressure thereof so that it remains slightly higher than the surrounding water pressure to react to the sea's compressive loading of the enclosure exterior. Actuator 38 remains unenergized, holding valve 37 closed so that no gas escapes from the enclosure.

When the vehicle reaches the desired depth, valves 55, 65 and 75 are closed to hold the buoyancy of chamber 40 and thus the buoyancy of the vehicle itself, constant. Closing valves 55, 65 and 75 fully seals the rigid buoyancy chamber thereby obviating positive feedback instabilities characteristic of prior art buoyancy control systems. Valve 37 is closed and pressure regulator 25 is adjusted to hold the pressure internally of enclosure 15 at the desired value.

Assuming that operation of the vehicle at a lesser depth is then desired, controller 35 opens valve 55 whereby additional gas is introduced into chamber 40, valve 75 being held open to allow discharge from chamber 40 of water displaced by the gas. Valve 65 remains closed. The decreased water volume in chamber 40 increases the buoyancy of the vehicle and the vehicle ascends to the desired depth. During such ascention, controller 35 opens valve 37 on the basis of the output of pressure sensor 120, thereby selectively venting enclosure 15 to hold the pressure internally thereof to that of the surrounding water.

For the control of valves 25, 37, 55, 65 and 75 as described hereinabove, controller 35 receives a signal from sensor 100 indicative of absolute water pressure, compares this signal with a preprogrammed value of pressure corresponding to the desired depth, and actuates the valves in the manner described to minimize any error between these signals in any manner well known in the art. The controller may be provided with circuitry to modulate the comparison of the actual and desired pressure (depth) signals with the output of a real-time clock circuit to measure and control vehicle velocity. Such control techniques are well known in the art and are therefore not disclosed in any greater detail herein.

From the description herein it will be understood that for moderate operational depths, vehicle depth may be controlled on the basis of absolute water pressures. However, when extensive operational depths (on the order of several thousand feet) are required, known absolute pressure sensors may not have sufficient accuracy or resolution to locate the vehicle at a desired depth and thereafter to hold the vehicle precisely at that particular depth. Indeed, in certain applications, operation at a depth, within a given range (as determined by sensor accuracy) of a particular reference depth, may be just as acceptable as operation at the exact reference depth. Referring to both FIGS. 1 and 2, the vehicle of the present invention employs a unique control circuit which maintains the vehicle at a constant depth within that range. Referring specifically to FIG. 1, as the vehicle ascends or descends to the reference depth as sensed by absolute pressure sensor 100, controller 35 maintains valve 90 opened by operation of actuator 95. When the vehicle approaches the desired range of the reference depth, valve 90 is closed, trapping a sample of the atmosphere within enclosure 15 inside reference volume 85. As set forth hereinabove, controller 35 maintains the atmosphere within enclosure 15 at a slightly higher pressure than the water pressure at the vehicle depth. Accordingly, at the desired depth, the gas pressure within chamber 85 is slightly higher than that indicated by absolute pressure sensor 100, and a differential pressure sensor 105 sends a signal to controller 35 indicative of this slight difference in pressure.

As set forth hereinabove, small changes in depth pressures which occur as the vehicle strays from its controlled depth are sensed by differential pressure sensor 105 which need only be of a narrow operating range. Inasmuch as absolute pressure sensor 100 is required for determinations that the vehicle is at its reference depth range, sensor 100 could also be used to detect that the vehicle had strayed from its reference depth, thereby avoiding the need for sensor 105. However, sensor 100 must operate over a very large pressure range, from zero depth pressure at sea level to as high as thousands of psi. Therefore, the inherent sensitivity and resolution of sensor 100 in detecting small excursions of the vehicle from its control depth is limited and significantly less than the inherent high resolution and sensitivity of the narrow range differential pressure sensor 105. Inasmuch as the amount of gas required to correct errors in vehicle control depth during a given operational period is inversely proportional to the resolution and sensitivity with which the depth error is detected, the characteristic high resolution and sensitivity of differential sensor 105 enhances the length of time the vehicle can hover at its control depth with a given initial quantity of control gas.

Figure 2:
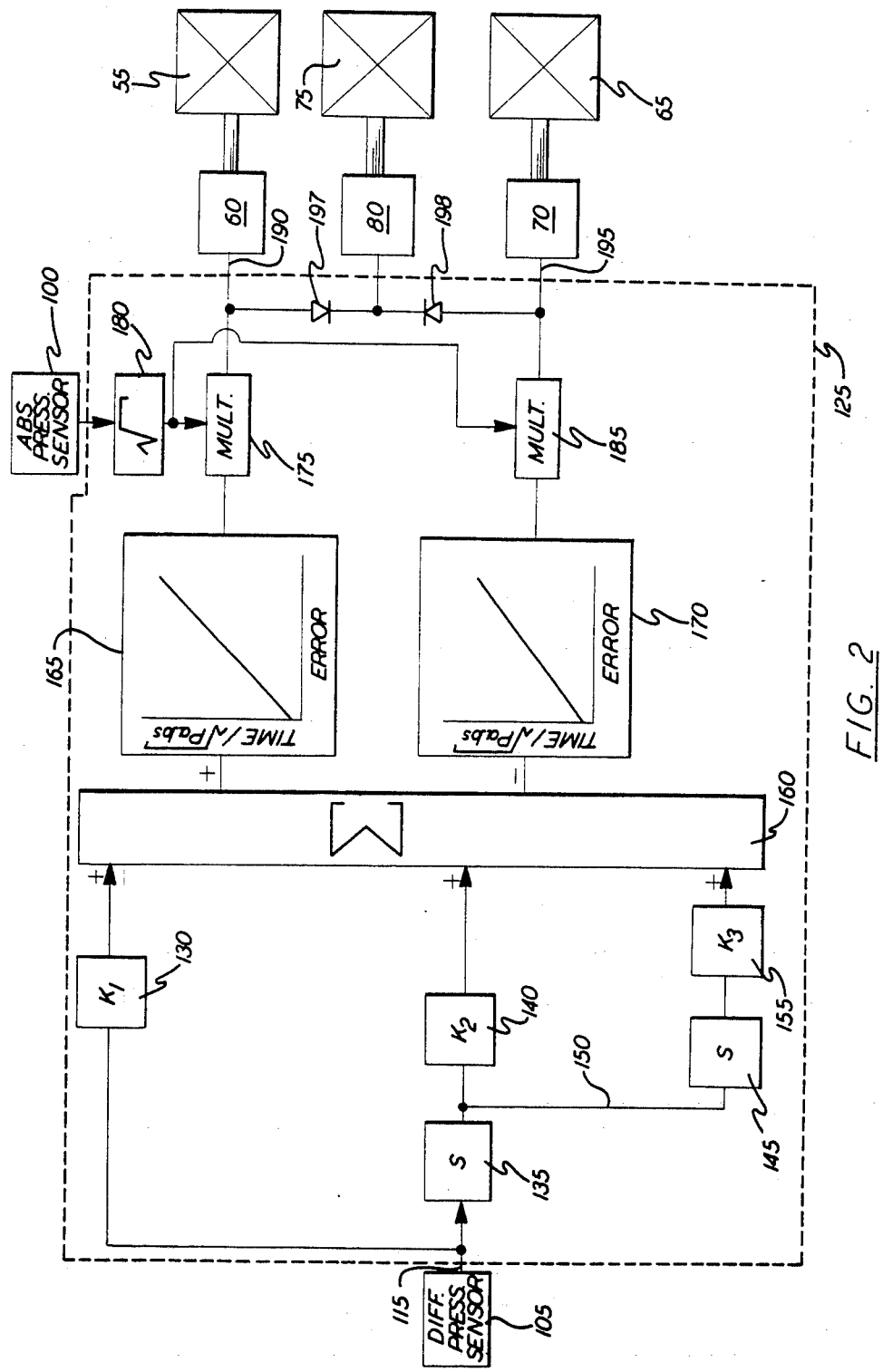
FIG. 2 is a schematic representation of the control system of the present invention.

Referring to FIG. 2, that portion of controller 35 which controls valves 55, 65 and 75 to maintain the vehicle at a constant control depth is shown within dashed line 125. As illustrated, the output of differential pressure sensor 105 is fed to controller subsystem 125 through line 115. This output signal is fed through line 115 to a multiplier 130 where the signal is multiplied by a first constant $K_1$. The output of pressure sensor 105 is also fed to circuit 135 which differentiates the signal with respect to time, the output of differentiator 135 being fed to multiplier 140 which multiplies this signal by a constant $K_2$. Differentiator 145 in line 150 is fed the output of differentiator 135 and takes the derivative of this signal with respect to time (the second time derivative of the output of pressure sensor 105). The output of differentiator 145 is fed to multiplier 155 where it is multiplied by a third constant $K_3$. Constants $K_1$, $K_2$ and $K_3$ scale the output of pressure sensor 105 and the first and second time derivatives thereof so that these signals may be summed in summing circuit 160. The output of summing circuit 160 is fed to digital data lookup memory or analog function generator 165 if the output is positive in sign, or, if the output is negative in sign, to lookup memory or function generator 170. Function generators 165 and 170 provide output signals of Time of valve opening divided by $\sqrt{P_{abs}}$ as functions of the signals fed to these circuits from summer 160. The output of lookup memory 165 is fed to a multiplier 175. Multiplier 175 is also fed a signal indicative of $\sqrt{P_{abs}}$ from circuit 180 which takes the square root of the absolute pressure signal provided by pressure sensor 100. Multiplier 175 multiplies the two input signals thereto, thereby cancelling the $\sqrt{P_{abs}}$ term from the output of circuit 165. In like manner, multiplier 185 cancels the $\sqrt{P_{abs}}$ term from the output of circuit 170, whereby time signals are fed to actuators 60 and 70 through lines 190 and 195, respectively. Accordingly, it will be seen that a net positive sum of the scaled pressure sensor output signal and the first and second derivatives thereof is converted into a time pulse input signal to actuator 60 thereby opening valve 55 to increase the buoyancy of the vehicle. Similarly, if the sum of the scaled pressure signal and the first and second derivatives thereof is negative in sign, a time pulse signal is fed to actuator 70 to open valve 65 thereby venting gas from chamber 40. Opening either valve 55 or 65 is accompanied by an opening of valve 75 as described hereinabove, diodes 197 and 198 passing a signal to energize actuator 80 whenever actuator 60 or actuator 70 are energized. The simultaneous shutting of valves 55, 65 and 75 seals chamber 40 to prevent positive feedback instabilities exhibited in prior art buoyancy control systems.

Figure 3:
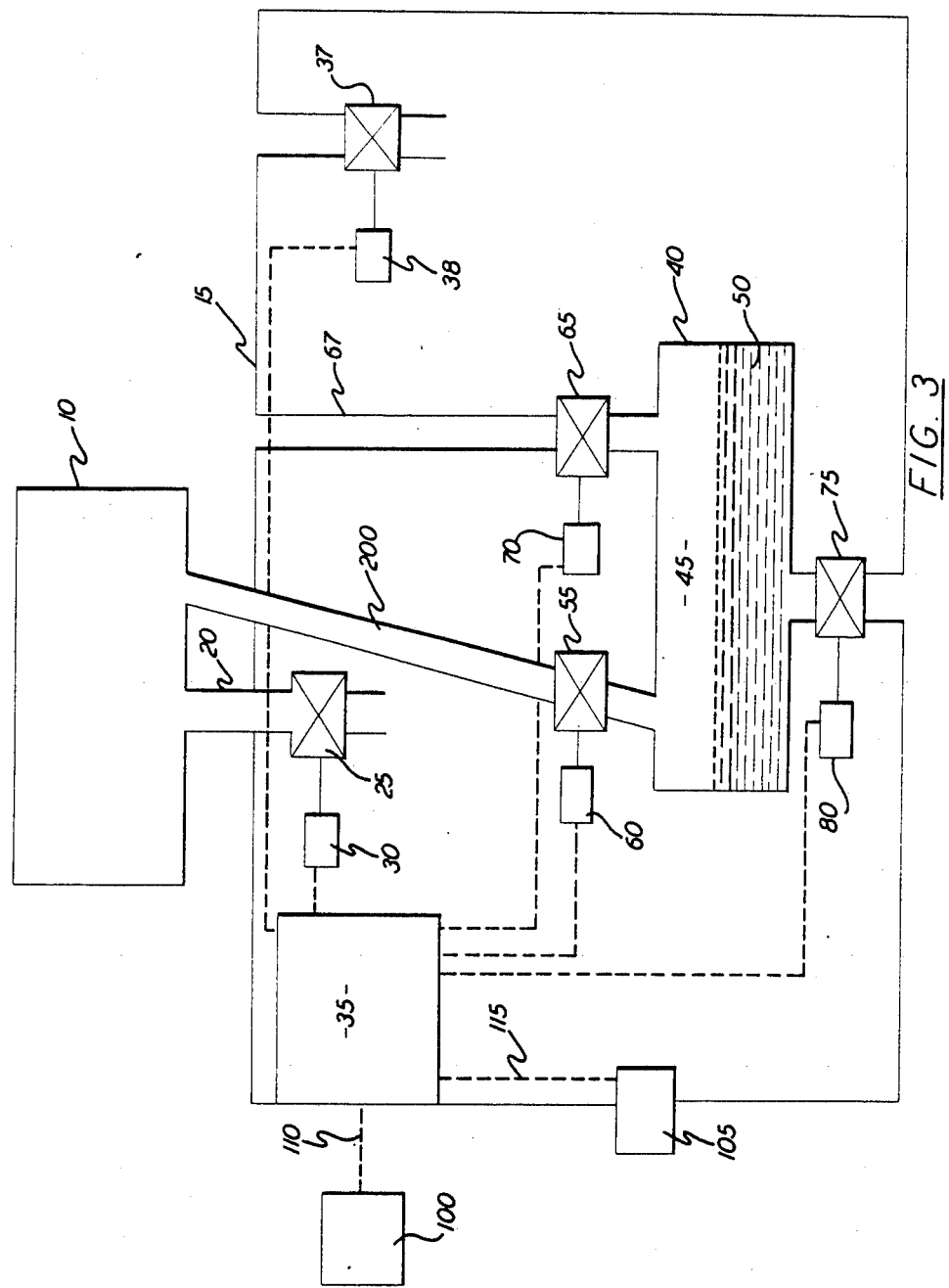
FIG. 3 is a schematic representation of another type of vehicle with which the control system of the present invention may be employed.

In addition to its suitability for controlling the external atmosphere (depth) of a submergible vehicle, the control system of the present invention is also well suited for control of other regulated pressure applications such as the internal atmosphere (cabin pressure) of an aircraft. In FIG. 3, bleed air from a gas turbine engine 210 is delivered to cabin (chamber) 215 of the aircraft through inflow valve 220 operated by actuator 225 which is controlled by controller 230. Stale air is vented from cabin 215 by outflow valve 235 operated by actuator 240, also controlled by controller 230. Absolute cabin pressure is sensed by absolute pressure sensor 245, the output thereof being fed through line 250 to the controller. Reference volume 255 communicates with the cabin interior by way of valve 260 operated by actuator 265 also controlled by controller 230. Differential pressure sensor 270 senses the difference in pressure between the cabin and reference volume 255, the output of the sensor being fed to controller 230 through line 275.

Operation of the system shown in FIG. 3 is descriptive of the airplane cabin example, but is analogous to that of the submergible vehicle discussed hereinabove. Cabin pressure is controlled by modulation of one or both valves 220 and 235 to attain a control pressure within a range (as determined by the accuracy of sensor 245) of a desired reference pressure in response to input from absolute pressure sensor 245. When the control cabin pressure is reached, as sensed by sensor 245, controller 230 signals actuator 265 to close valve 260 trapping the desired atmospheric conditions within reference volume 255. Thereafter, excursions of cabin control pressure from the trapped reference pressure are sensed by differential pressure sensor 270. The output of differential pressure sensor 270 is fed to controller 230 which modulates valves 220 and/or 235 (in a like manner as valves 55 and 65 of the submergible vehicle) to maintain a constant operation at the cabin control pressure.

While the control system of the present invention has been described with respect to depth control in a submergible vehicle and cabin pressure control in an aircraft, it will be understood that this system may find utility with respect to various other vehicles. While a particular embodiment of the present invention has been shown and described, it will be understood that various modifications will, from the disclosure herein, suggest themselves to those skilled in the art and it is intended by the following claims to cover all such modifications as fall within the true spirit and scope of this invention.

Having thus described the invention, what is claimed is:

1. In a vehicle including a chamber, the pressure of a gas contained within said chamber determining atmospheric conditions experienced by said vehicle and being controlled by the select flow of said gas from a source thereof to said chamber, and discharge of said gas from said chamber, through control valve means in fluid communication with the interior of said chamber, control apparatus characterized by:
   an absolute pressure sensor providing a first signal indicative of the absolute pressure of said atmosphere;
   means providing a reference sample of a desired atmospheric pressure experienced by said vehicle interiorly thereof;
   a differential pressure sensor providing a second signal indicative of the difference in pressure between said sample and said atmosphere at conditions varying from said desired atmospheric conditions; and
   signal processing means responsive to said first signal for providing actuation signals to said control valve means as a function of the difference between said first signal and a desired reference pressure of said atmosphere to set a control pressure within said chamber within a range of said reference pressure, said signal processing means also being responsive to said second signal for providing actuation signals to said control valve means as a function of said second signal to set a pressure within said chamber to reestablish said atmospheric pressure at said control pressure thereof from unwanted excursions from said control pressure.

2. The control apparatus of claim 1 characterized by said signal processing means providing said actuation signal to said control valve means as a function of the first derivative with respect to time of said second signal.

3. The control apparatus of claim 1 characterized by said signal processing means providing said actuation signal to said control valve means as a function of the second derivative with respect to time of said second signal.

4. The control apparatus of claim 1 characterized by said vehicle comprising an aircraft, said chamber comprising a cabin thereof supplied with pressurized air, said atmosphere comprising said cabin interior, said valve means comprising an inlet valve communicating with a source of said pressurized air and said cabin interior for controlling airflow into said cabin and an outflow valve communicating with ambient and said cabin interior for controlling the discharge of air from said cabin.

5. The control apparatus of claim 4 characterized by said means providing a reference sample of said desired atmosphere comprising a reference volume located within said aircraft cabin and openable thereto and sealable therefrom, whereby the condition of said sample remains constant in the face of changing pressure within said vehicle interior.

6. The control apparatus of claim 1 characterized by said vehicle being capable of hoverable submersion within a body of water, said atmospheric conditions being the static pressure of said water at the depth of said vehicle, said chamber comprising a sealable buoyancy chamber supplied with said gas from a source thereof, and said valve means comprising first and second valves, said first valve communicating with said buoyancy chamber and said gas source for the pressurization of said buoyancy chamber and said second valve connecting said buoyancy chamber with ambient for venting said buoyancy chamber.

7. The control apparatus of claim 6 characterized by a pressure regulator communicating with the interior of said vehicle and said source of gas and by an outflow valve through which the interior of said vehicle communicates with ambient and by said signal processing means providing actuation signals to said pressure regulator and outflow valve as a function of said first signal for maintenance of said vehicle interior at substantially the same pressure as the static pressure of said water at the depth of said vehicle.

8. The control apparatus of claim 7 characterized by said means providing a reference sample of said desired atmosphere comprising a reference volume located interiorly of said vehicle and openable thereto and sealable therefrom, whereby the condition of said sample remains constant in the face of changing pressure within said vehicle interior.

* * * * *